(12) United States Patent
Welnick et al.

(10) Patent No.: US 7,907,946 B2
(45) Date of Patent: Mar. 15, 2011

(54) CIRCUIT AND METHOD FOR ACQUIRING A MORE-PREFERRED SYSTEM IDENTIFICATION (SID) ELEMENT

(75) Inventors: William Welnick, Poway, CA (US); David Krause, Hainesville, IL (US)

(73) Assignee: Motorola, Inc., Schaumburg, IL (US)

( * ) Notice: Subject to any disclaimer, the term of this patent is extended or adjusted under 35 U.S.C. 154(b) by 210 days.

(21) Appl. No.: 10/685,919

(22) Filed: Oct. 15, 2003

(65) Prior Publication Data

US 2005/0085228 A1    Apr. 21, 2005

(51) Int. Cl.
*H04W 4/00*    (2009.01)
(52) U.S. Cl. .................. 455/434; 455/432.1; 455/435.2; 455/435.3; 455/552.1; 455/437
(58) Field of Classification Search .............. 455/432.1, 455/434, 435.1, 552.1, 419
See application file for complete search history.

(56) References Cited

U.S. PATENT DOCUMENTS

| | | | |
|---|---|---|---|
| 4,916,728 A * | 4/1990 | Blair ............................ 455/455 |
| 5,442,806 A * | 8/1995 | Barber et al. ............. 455/435.2 |
| 5,586,338 A * | 12/1996 | Lynch et al. .................... 455/433 |
| 5,734,980 A * | 3/1998 | Hooper et al. ................ 455/434 |
| 5,784,693 A * | 7/1998 | Barber et al. ................. 455/434 |
| 5,870,674 A * | 2/1999 | English ...................... 455/432.2 |
| 5,889,768 A | 3/1999 | Storm et al. |
| 5,950,130 A * | 9/1999 | Coursey ..................... 455/432.1 |
| 5,983,115 A * | 11/1999 | Mizikovsky .................. 455/512 |
| 6,085,085 A * | 7/2000 | Blakeney et al. .......... 455/426.1 |
| 6,119,005 A * | 9/2000 | Smolik ......................... 455/436 |
| 6,148,197 A * | 11/2000 | Bridges et al. ............. 455/432.3 |
| 6,160,799 A | 12/2000 | Krause et al. |
| 6,259,917 B1 * | 7/2001 | Elzein ........................ 455/435.2 |
| 6,463,298 B1 | 10/2002 | Sorenson et al. |
| 6,466,802 B1 | 10/2002 | Blakeney, II et al. |
| 6,470,182 B1 | 10/2002 | Nelson |
| 6,483,824 B1 * | 11/2002 | Ault ............................... 370/332 |
| 6,584,311 B1 * | 6/2003 | Sorenson et al. .......... 455/432.1 |
| 6,625,451 B1 * | 9/2003 | La Medica et al. ........... 455/434 |
| 6,782,259 B2 * | 8/2004 | Bamburak et al. ............ 455/434 |
| 6,978,142 B2 * | 12/2005 | Jokimies ....................... 455/449 |
| 7,218,942 B2 * | 5/2007 | Koo et al. ...................... 455/464 |
| 7,363,032 B2 * | 4/2008 | Phillips et al. ............. 455/422.1 |
| 7,657,261 B2 * | 2/2010 | Cooper et al. ................ 455/434 |
| 2003/0022689 A1 * | 1/2003 | McElwain et al. ........... 455/551 |
| 2003/0050090 A1 * | 3/2003 | Raffel et al. .................. 455/552 |
| 2003/0083064 A1 * | 5/2003 | Cooper ......................... 455/432 |
| 2003/0086396 A1 | 5/2003 | Gurski et al. |
| 2004/0087309 A1 * | 5/2004 | Joshi et al. .................... 455/450 |

* cited by examiner

*Primary Examiner* — Sharad Rampuria
(74) *Attorney, Agent, or Firm* — Vedder Price P.C.

(57) ABSTRACT

A circuit (10) to acquire a more-preferred stored SID element (62) includes memory (20) and logic circuitry (30). The memory (20) stores a roaming list (60), such as a PRL, that includes a plurality of SID elements ranked according to an order of preference including at least one more-preferred stored SID element (62) and at least one less-preferred stored SID element (64). The logic circuitry (30) is coupled to the memory (20) and performs a first more-preferred SID acquisition sequence (80) and then second more-preferred SID acquisition sequence (82). The second more-preferred SID acquisition sequence (82) includes repeatedly attempting acquisition of the at least one more-preferred stored SID element (62) during the second more-preferred SID acquisition sequence (82) while also attempting to acquire the at least one less-preferred SID element (64) if desired.

21 Claims, 5 Drawing Sheets

CIRCUIT AND METHOD FOR ACQUIRING A MORE-PREFERRED SYSTEM IDENTIFICATION (SID) ELEMENT

FIELD OF THE INVENTION

The invention relates generally to wireless communication devices and methods and, more particularly, to a circuit and method for acquiring service on wireless communication systems.

BACKGROUND OF THE INVENTION

As the demand for wireless communications increases, and as users increasingly travel between different wireless communication systems, there is a corresponding increase in demand for roaming between wireless communication systems. Typically, a user subscribes to wireless communication services in a home region. A wireless communication service operator may program the wireless device with the subscriber's home system as a more-preferred wireless communication system. When the user of a wireless device travels from one geographic region to another, the wireless communication service operator may program the wireless device to select wireless services from among several wireless communication systems. Outside of the user's home system, the user may communicate by means of a roaming service with any of a number of available wireless communication services. A "roamer" is a wireless device requiring service in a system operated by a wireless communication service operator other than the home system.

The wireless device maintains a list of system identification (SID) elements stored in memory. This list of stored SID elements is referred to herein as the preferred roaming list (PRL). Some of the stored SID elements are "more-preferred" stored SID elements. More-preferred stored SID elements are associated with wireless communication systems that the home operator prefers such that the wireless device acquires the more preferred systems. Additionally, some of the stored SID elements in the PRL include "less-preferred" stored SID elements, such that the wireless device only acquires less-preferred stored SID elements if the more-preferred stored SID elements are not available according to a roaming algorithm as is known in the art. The PRL will likely contain numerous stored SID elements as well as corresponding acquisition information, which differ with respect to their SIDs and their geographic regions, but may include, for example, channel number, frequency block designator, and mode as is known in the art.

The PRL is maintained in such a manner that the wireless device can readily determine which stored SID elements are more-preferred or less-preferred within a common geographic region. The references to common geographic regions refer to regions where different stored SID elements share a common or overlapping coverage area. Additionally, the stored SID elements that provide service in a common geographic region are prioritized such that each stored SID element is ranked from a more-preferred stored SID element to a less-preferred stored SID element within the geographic region.

The wireless device attempts to acquire service from a desired wireless communication system through an acquisition process. According to the acquisition process, the wireless device selects a stored SID element from the PRL and attempts to receive corresponding SID information that is broadcast by the desired wireless communication system and received by the wireless device. Each base station broadcasts SID information over a control channel in order to uniquely identify the wireless system it is associated with. The wireless device determines whether it acquired the desired wireless communication system by comparing the received SID information with the stored SID element corresponding to the desired wireless communication system.

The wireless device determines whether it is roaming by comparing the stored SID elements corresponding to the home wireless communication system or systems programmed in the wireless device, with the SID information of the wireless communication system providing service that is broadcast by that system and received by the wireless device. The wireless device also uses the received SID information to determine the geographic region in which the wireless device is located by comparing the received SID information with the geographic regions associated with the corresponding SID elements in the PRL.

Once the wireless device identifies the current geographic area, the wireless device attempts to acquire service on a more-preferred stored SID element within the wireless device's current geographic region. If the acquired SID information belongs to a more-preferred stored SID element in the PRL, the wireless device camps on the more-preferred stored SID element as is known in the art. However, if the home system has a coverage hole or an area of interference causing a temporary loss of service, the wireless device may then attempt to roam outside of the user's home system. As a result of entering the coverage hole or the interference region, the wireless device cannot acquire the more-preferred stored SID element, i.e., the home wireless communication system.

According to one known roaming method, once the wireless device passes through an interference region or a coverage hole such that acquisition with the more-preferred stored SID element is temporarily unavailable, the wireless device seeks to acquire another stored SID element in the PRL. The wireless device first attempts acquisition according to a first SID acquisition sequence. The first SID acquisition sequence includes repeatedly attempting acquisition of the more-preferred stored SID element. If the wireless device is unable to acquire the more-preferred stored SID element according to the first SID acquisition sequence, and the wireless device acquires a less-preferred stored SID element in the PRL, then the wireless device attempts acquisition according to a second SID acquisition sequence. The second SID acquisition sequence includes single sequential acquisition attempts of each stored SID element in the PRL. As a result, according to the second acquisition sequence, the wireless device makes a single attempt to acquire the more-preferred stored SID element listed in the PRL during the second acquisition sequence.

If the wireless device fails to acquire the at least one more-preferred SID element, and acquires the at least one less-preferred stored SID element in the PRL, then the wireless device registers as a roamer and camps on the less-preferred stored SID element. As a result, if the user initiates a call or receives a call, then the call will be serviced on the less-preferred stored SID element, even if the wireless device emerges from the interference region or coverage hole and acquisition may be available on one of the more-preferred stored SID elements. For example, by the time the wireless device initiates or receives a call after acquisition of the less-preferred stored SID element, the wireless device may have traveled outside of the coverage hole or the interference region. As a result, the wireless device camps on the less-preferred stored SID element and not on the more-preferred stored SID element. The user may possibly incur roaming charges, although the wireless device is actually within the coverage area corresponding to the more-preferred stored SID element.

BRIEF DESCRIPTION OF THE DRAWINGS

The present invention is illustrated by way of example and not limitation in the accompanying figures, in which like reference numerals indicate similar elements, and in which.

DETAILED DESCRIPTION OF THE PREFERRED EMBODIMENTS

A circuit to acquire a more-preferred stored SID element includes memory and logic circuitry. The memory stores a roaming list, such as a PRL, that includes a plurality of SID elements ranked according to an order of preference including at least one more-preferred stored SID element and at least one less-preferred stored SID element. The logic circuitry is coupled to the memory and performs a first more-preferred SID acquisition sequence and then a second more-preferred SID acquisition sequence. The second more-preferred SID acquisition sequence includes repeatedly attempting acquisition of the at least one more-preferred stored SID element during the second more-preferred SID acquisition sequence while also attempting to acquire the at least one less preferred SID element if desired.

Among other advantages, the present invention improves the acquisition of and search for at least one more-preferred stored SID element stored in the roaming list. As previously stated, conventional scanning sequences in roaming algorithms typically scan for the home system only once within the second more-preferred SID sequence. Since the second more-preferred SID acquisition sequence in the present invention scans more often for the more-preferred system than in conventional roaming algorithms the probability of acquiring at least one more-preferred stored SID element increases. According to one embodiment, the circuit repeatedly scans for the more-preferred (i.e., home) system even after the circuit determines that acquisition on the more-preferred system is unavailable and acquires service from a less-preferred system. By extending the search for the more-preferred system after a less-preferred system is acquired, the window of opportunity to find the more-preferred system will be increased thus increasing the likelihood that the wireless device will acquire the more-preferred system. Additionally, extending the total time that the circuit attempts to acquire the more-preferred system, as well as increasing the number of acquisition attempts, further increases the probability that a circuit will acquire the more-preferred system especially in the situations where the circuit passes through a coverage hole or interference region.

Further, as the performance of receiver circuits improves generally, such as the ability of the receiver circuit to scan and acquire a stored SID element more quickly, the scanning receiver spends a proportionately shorter amount of time scanning and acquiring SID information. As the scan time decreases, the scan time for acquiring the most-preferred system decreases, and therefore the chance of acquiring the most-preferred system decreases. Consequently, as the scan time decreases, increasing the total time, and the number of attempts to acquire the more preferred system can significantly increase the likelihood of acquiring the more-preferred system.

Figure 1:
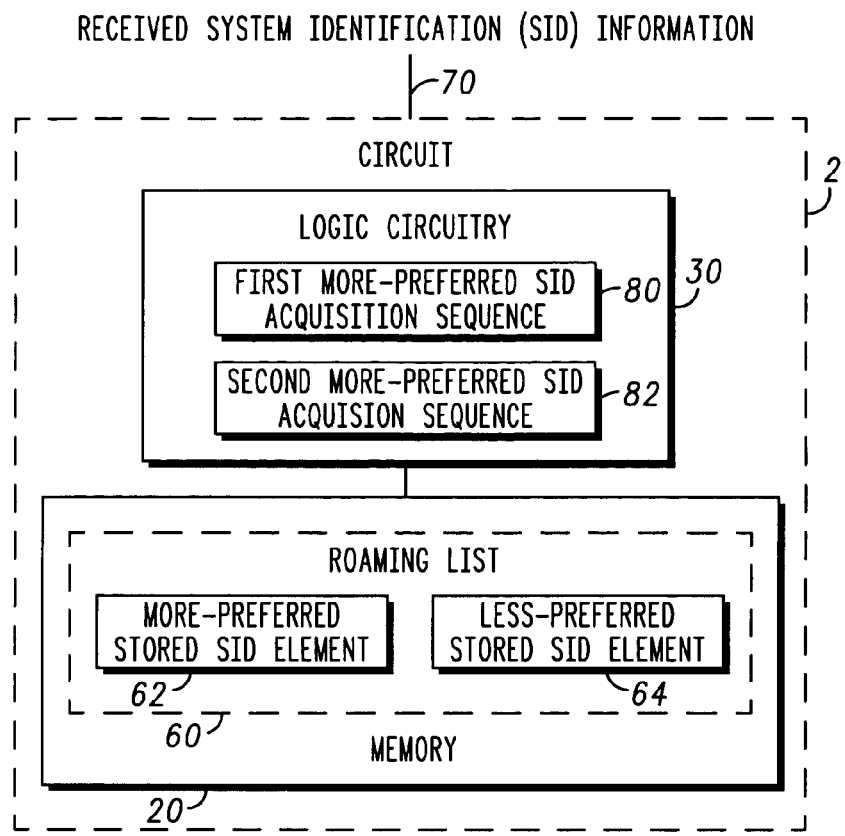
FIG. 1 is a block diagram illustrating one example of a circuit operative to acquire a more-preferred stored SID element according to one embodiment of the invention.
Figure 5:
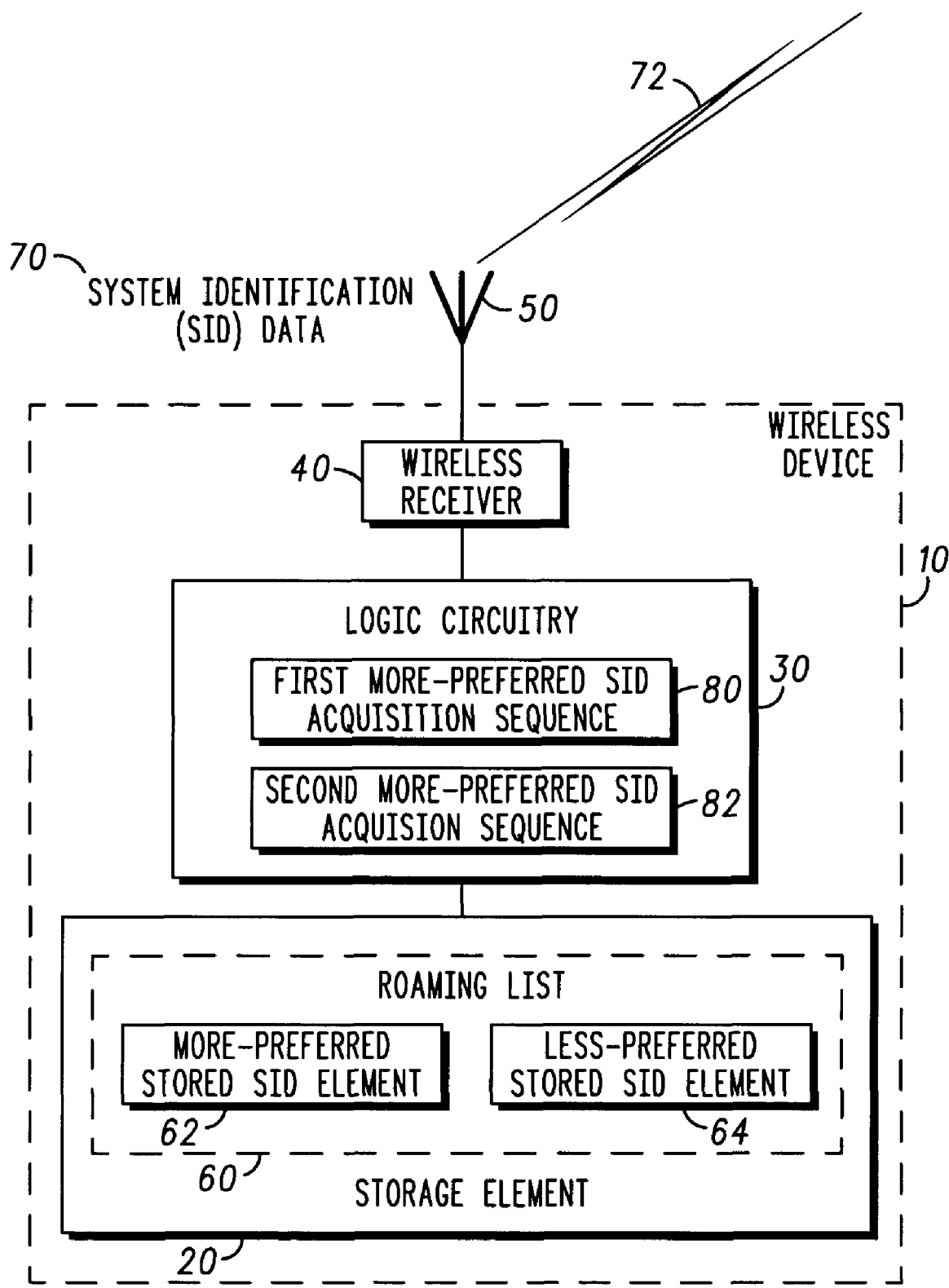
FIG. 5 is a block diagram illustrating one example of a wireless device according to one embodiment of the invention.

FIGS. 1 and 5 illustrate exemplary embodiments of a circuit 2 and a wireless device 10 to acquire SID information. According to the embodiment of FIG. 1, circuit 2 includes memory 20 and logic circuitry 30. According to the embodiment shown in FIG. 5, wireless device 10 includes memory 20, logic circuitry 30 and wireless receiver 40 coupled to antenna 50. The various elements of the circuit 2 and wireless device 10 are linked by a plurality of links. The links may be any suitable mechanisms for conveying electrical signals or data as appropriate. The logic circuitry 30 may be one or more suitably programmed processors such as a microprocessor, a microcontroller, or a digital signal processor and therefore includes associated memory, such as memory 20, that contains executable instructions that when executed causes the logic circuitry 30 to carry out the operations described herein. Alternatively, as used herein, logic circuitry 30 includes discrete logic, state machines or any other suitable combination of hardware, software and/or firmware.

Memory 20 stores a roaming list 60 such as a PRL including a plurality of SID elements ranked according to an order of preference including at least one more-preferred stored SID element 62, and at least one less-preferred stored SID element 64. According to one embodiment, the roaming list 60 includes an intermediate stored SID element 66 and may be associated with either a less or more preferred system. A wireless communication operator may program the logic circuitry 30 to select a more-preferred stored SID element 62 on the user's home system or at least on systems where the home system operator has roaming agreements with other wireless system operators. Memory 20 may be any suitable memory element that stores digital data. This includes but is not limited to ROM, RAM, distributed memory or any other suitable elements. Although memory 20 is shown coupled to logic circuitry 30, memory 20 may be included within logic circuitry 30.

Wireless receiver 40 receives broadcast SID information 70 over an overhead channel on air interface 72 from antenna 50 and provides the SID information 70 to the logic circuitry 30. The logic circuitry 30 is coupled to the memory 20 and to the wireless receiver 40 to attempt to acquire the SID information 70 from the wireless receiver 40 corresponding to the at least one of the plurality of SID elements stored in the roaming list 60 of the memory 20. If the logic circuitry 30 does not acquire or loses acquisition with the at least one more-preferred stored SID element 62 stored in the memory 20 and instead acquires the at least one less-preferred stored SID element 64 stored in the memory 60, then the logic circuitry 30 performs a first more-preferred SID acquisition sequence 80 and a second more-preferred SID acquisition sequence 82 that includes repeatedly attempting acquisition of the at least one more-preferred stored SID element 62.

Figure 2:
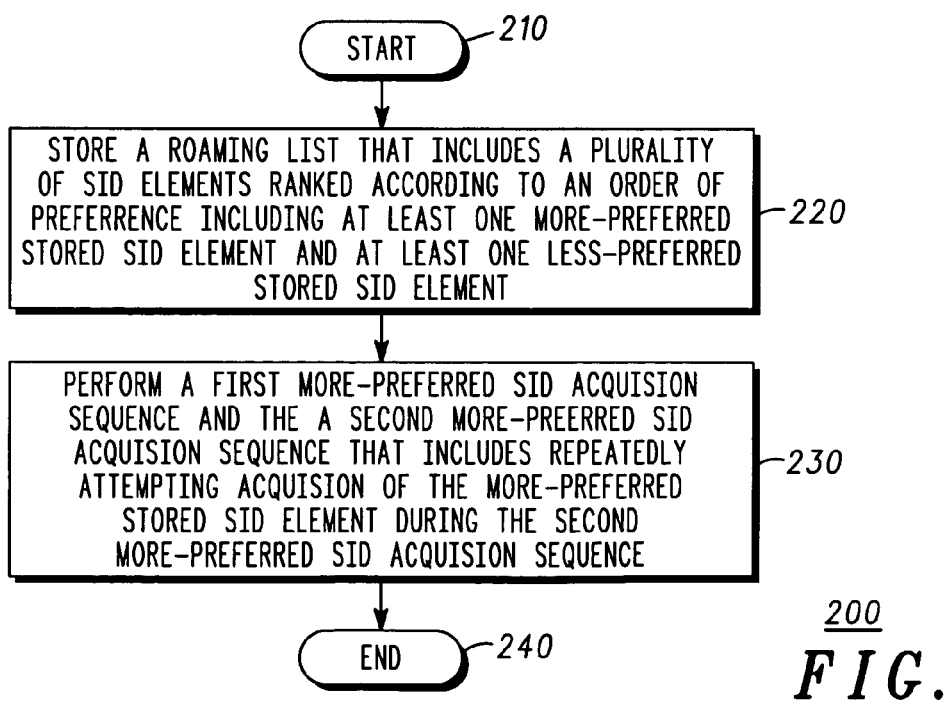
FIG. 2 is a flow chart illustrating one example of a method for acquiring a more-preferred stored SID element in a wireless device according to one embodiment of the invention.

FIG. 2 illustrates a method 200 for acquiring a more-preferred stored SID element 62 in a wireless device 10 according to one embodiment of the invention. The method 200 may be carried out by the logic circuitry 30 in wireless device 10. However, any suitable structure may also be used. It will be recognized that method 200 beginning with step 210 will be described as a series of operations; however, the operations may be performed in any suitable order and may be repeated in any suitable combination. The method 200 for acquiring SID information may be performed while the wireless device 10 is in a mode to monitor communication signals such as while camping on broadcast SID information 70. Alternatively, the method 200 may be performed while in a call, for example, or during any suitable point in time.

As shown in step 220, logic circuitry 30 stores a roaming list 60 including a plurality of SID elements ranked according to an order of preference including at least one more-preferred stored SID element 62, and at least one less-preferred stored SID element 64.

As shown in step 230, the logic circuitry 30 performs a first more-preferred SID acquisition sequence 80 and then a second more-preferred SID acquisition sequence 82 that includes repeatedly attempting acquisition of the at least one more-preferred stored SID element 62 during the second more-preferred SID acquisition sequence 82. As previously stated, the wireless device 10 may lose acquisition with or otherwise fail to acquire the at least one more-preferred stored SID element 62 by entering into a coverage hole or an interference region such that the wireless receiver 40 can no longer demodulate the SID information 70 of the more-preferred stored SID element 62 resulting in the loss of acquisition for the more-preferred stored SID element 62. However, if the wireless device 10 passes through a coverage hole or an interference region, then the wireless device 10 may be able to reacquire the most-preferred stored SID element 62 if an attempt to acquire the more-preferred stored SID element is made.

The determination that the logic circuitry 30 loses acquisition with the more-preferred stored SID element 62 may be based on any trigger such as the loss of signal strength level below a threshold or the deterioration of the quality of the signal below a quality threshold level for the overhead pilot channel. The quality of the signal may be associated with a signal to noise ratio, such as for example, Ec/Io or any other suitable quality indication. Additionally, the scanning or acquisition of a SID element may be performed with any modulation technique such as frequency division multiple access (FDMA), time division multiple access (TDMA), or code division multiple access (CDMA). For example, attempting to scan and acquire a subcode in the CDMA may be performed by decoding a code offset as is known in the art.

Figure 3:
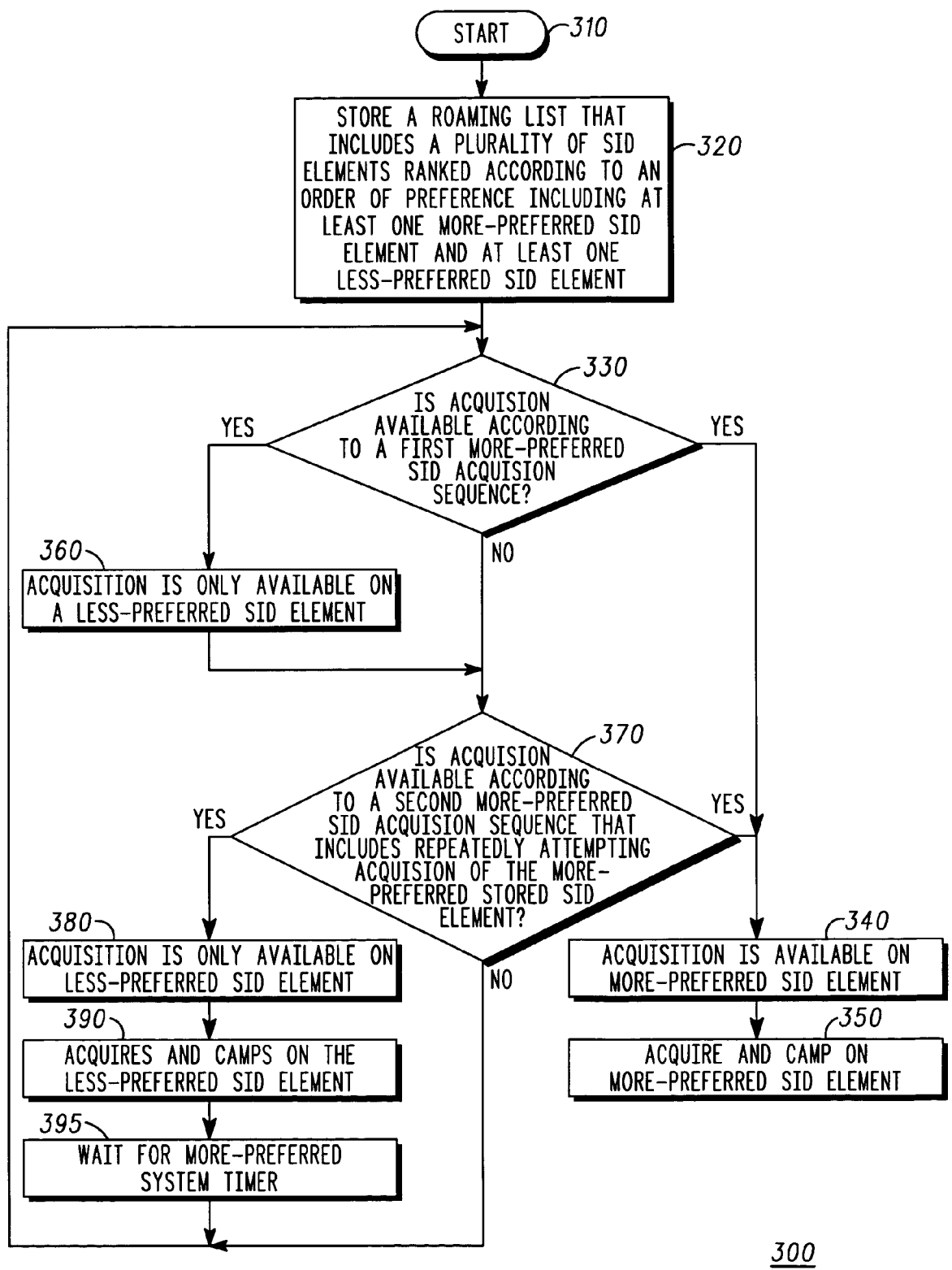
FIG. 3 is a flow chart illustrating another example of a method for acquiring a more-preferred stored SID element in a wireless device according to another embodiment of the invention.

FIG. 3 illustrates one example of a method 300 for the priority acquisition of at least one more-preferred stored SID element 62 in a wireless device 10 according to another embodiment of the invention. The method 300 may be carried out by the wireless device 10. However, any other suitable structure may also be used. It will also be recognized that the method 300, beginning with step 310 will be described as a series of operations, but the operations may be performed in any suitable order and may be repeated in any suitable combination.

As shown in step 320, the logic circuitry 30 stores a roaming list (60) that includes a plurality of SID elements ranked according to an order of preference including at least one more-preferred stored SID element 62, and at least one less-preferred stored SID element 64.

As shown in step 330, the logic circuitry 30 attempts to acquire or reacquire the more-preferred stored SID element 62 according to a first more-preferred SID acquisition sequence 80. For example, the logic circuitry 30 may have lost acquisition with the at least one more-preferred stored SID element 62. According to one embodiment, the logic circuitry 30 performs a first more-preferred SID acquisition sequence 80 such that the logic circuitry 30 repeatedly attempts acquisition on the at least one more-preferred stored SID element 62. If the logic circuitry 30 acquires the more-preferred stored SID element 62 as shown in step 340 then the logic circuitry 30 acquires and camps on the more-preferred stored SID element 62 at step 350.

As shown in step 360, if the logic circuitry 30 during the first more-preferred SID acquisition sequence 80 determines that acquisition is only available on a less-preferred stored SID element 64 as shown in step 360, then the logic circuitry 30 searches for the at least one less-preferred stored SID element 64 at step 370. Accordingly, the logic circuitry 30 acquires a less-preferred stored SID element 64 if available at step 360. Since the logic circuitry 30 has not acquired the more-preferred stored SID element 62 but has acquired the less-preferred stored SID element 64, the logic circuitry 30 may store the acquired less-preferred stored SID element 64 and execute the second more-preferred SID acquisition sequence 82 in a further attempt to acquire the at least one more-preferred SID element 62. If the logic circuitry 30 upon execution of the first more-preferred SID acquisition sequence 80 at step 360 cannot acquire any SID element stored in roaming list 60, then processing also continues to step 370. If upon execution of the second more-preferred SID acquisition sequence 82, acquisition is only available on the at least one less-preferred stored SID element 64 as shown in step 390, then the logic circuitry 30 camps on the acquired less-preferred stored SID element as shown in step 390.

As shown in step 370, in response to scanning according to the first more-preferred SID acquisition sequence 80 and not acquiring the more-preferred stored SID element 62, the logic circuitry 30 attempts acquisition according to the second more-preferred SID acquisition sequence 82. According to one embodiment, the logic circuitry 30 performs the second more-preferred SID acquisition sequence 82 such that the logic circuitry 30 repeatedly attempts acquisition on the at least one more-preferred stored SID element 62, as previously described. According to one embodiment, the first more-preferred SID acquisition sequence 80 may be identical to the second more-preferred SID acquisition sequence 82. If acquisition is available on the at least one more-preferred stored SID element 62 at step 340, then the logic circuitry 30 waits for a more-preferred system timer to expire and returns to step 330 for another attempt to acquire the at least one more-preferred SID stored element 62 according to the first more-preferred SID acquisition sequence 80.

As shown in step 380, if upon execution of the second more-preferred SID acquisition sequence 82, acquisition is only available on the at least one less-preferred stored SID element 64, then the logic circuitry 30 optionally acquires and camps on the less-preferred stored SID element 64 as shown in step 390 but continues processing as shown in step 395. However, according to another embodiment, if the logic circuitry 30 cannot acquire the at least one more-preferred stored SID element 62, then the logic circuitry 30 attempts to acquire another SID element associated with another channel within the same geographic region, having the same SID, within the same base station, or with an adjacent base station. Accordingly, any appropriate SID element may be acquired and any appropriate requirements may be established such as acquiring any available or any appropriate SID element that meets a certain minimum threshold requirement based on, for example, signal strength or a quality indication associated with the received SID element as previously discussed.

As shown in step 395, if after the logic circuitry 30 attempts acquisition according to the second more-preferred SID acquisition sequence 82, and if the logic circuitry 30 has not been able to acquire any SID elements stored in roaming list 60, then the logic circuitry 30 returns to step 330 for another attempt to acquire the at least one more-preferred SID stored element 62 according to the first more-preferred SID acquisition sequence 80. According to another embodiment, when the more-preferred system timer expires, logic circuitry 30 performs the second more preferred SID acquisition sequence 82 at step 370 for another attempt to acquire the at least one more-preferred SID stored element 62.

Figure 4:
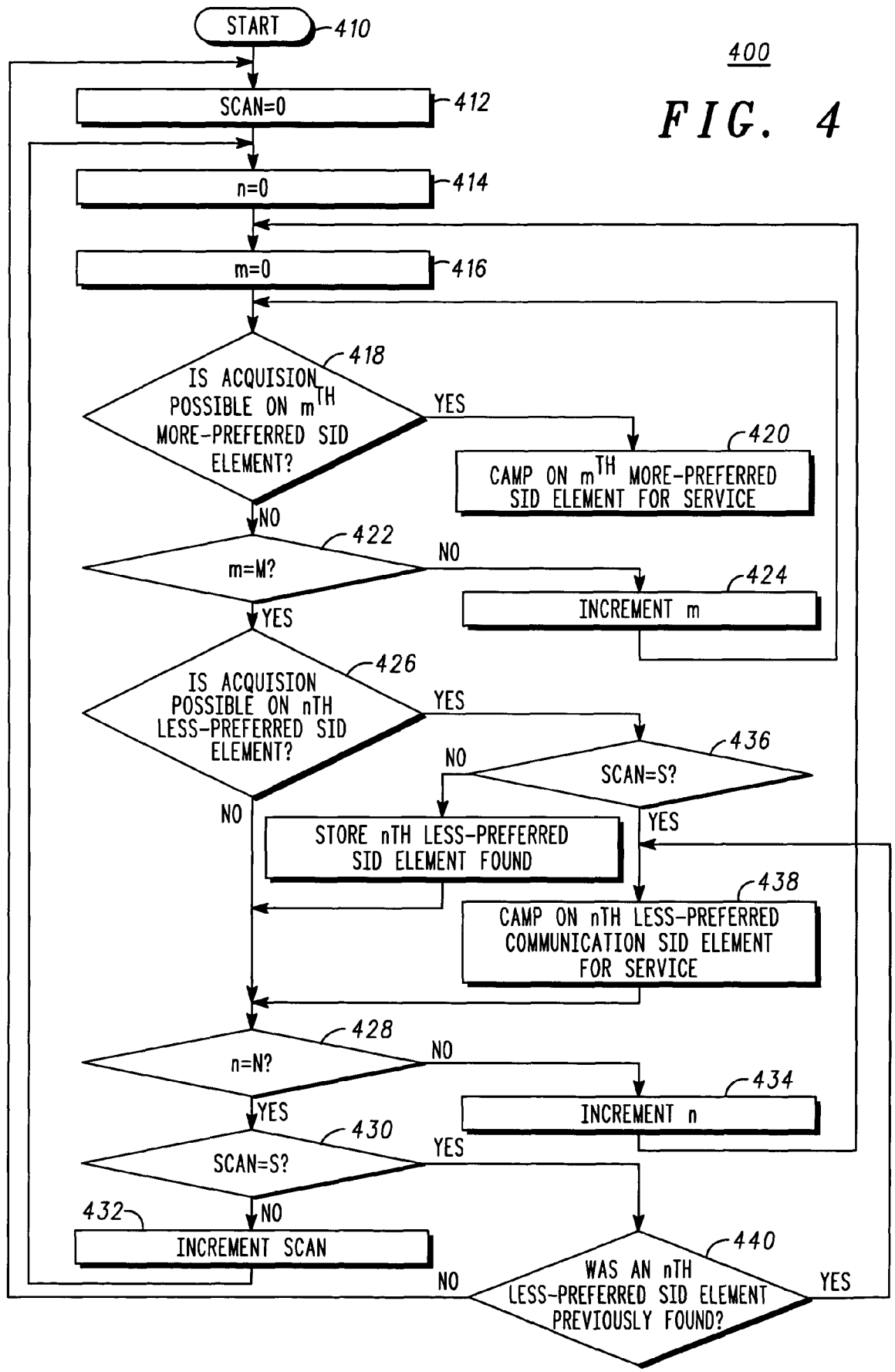
FIG. 4 is a flow chart illustrating one example of a method for performing an acquisition scan sequence according to one embodiment of the invention.

FIG. 4 illustrates one embodiment of a method 400 for performing acquisition scan sequences. For example, the acquisition scan sequences may be performed according to the first more-preferred SID acquisition sequence 80 and the second more-preferred SID acquisition sequence 82 previously described. The method 400 may be carried out by the logic circuitry 30. However, any other suitable structure may also be used. It will be recognized that the method 400 beginning with step 410 will be described as a series of operations, but the operations may be performed in any suitable order as may be repeated in any suitable combination.

As shown in step 412, a scan count equals zero. The scan count may represent the number of acquisition scan sequences such as for example, a first, second, third or more acquisition scan sequence. According to one example, a scan count equal to zero corresponds to the first more-preferred SID acquisition sequence 80, and a scan count equal to one corresponds to the second more-preferred SID acquisition sequence 82.

As shown in step 414, n is initialized to zero, where n corresponds to the number of less-preferred communication SID elements stored in the roaming list 60. As shown in step 416, m is similarly initialized to zero, where m corresponds to the number of more-preferred SID elements in the roaming list 60. The variables m and n may be any suitable integers to indicate the number of corresponding more-preferred SID elements and the number of corresponding less-preferred stored SID elements respectively.

As shown in step 418, the logic circuitry 30 determines if acquisition is possible on the $m^{th}$ more-preferred SID element. If acquisition is available at any time on a more-preferred stored SID element 62, in this case the $m^{th}$ more-preferred stored SID element, then the logic circuitry 30 acquires and camps on the $m^{th}$ more-preferred stored SID element at step 420. If however acquisition is not possible on the $m^{th}$ more-preferred stored SID element at step 418, then the logic circuitry 30 determines if another more-preferred stored SID element is stored in the roaming list 60.

As shown in step 422, logic circuitry 30 determines if the maximum number of more-preferred stored SID elements, M, have been scanned. The logic circuitry 30 compares the current value of m indicating the currently scanned more-preferred stored SID element 62 with the maximum number of more-preferred stored SID elements stored in roaming list 60 as designated by M. If all more-preferred stored SID elements have been scanned, then the method continues to step 426. However, if not all of the more-preferred stored SID elements have been scanned, then m is incremented at step 424 and the logic circuitry 30 attempts acquisition on the next sequentially available more-preferred stored SID element 62 stored in roaming list 60 as shown at step 418. As shown in step 426, since all the more-preferred stored SID elements 62 have been scanned and none are available, then the logic circuitry 30 scans to see if the next less-preferred stored SID element 64 is available for acquisition.

As shown in step 426, the logic circuitry 30 determines if acquisition is possible on the $n^{th}$ less-preferred stored SID element. If not, then logic circuitry 30 determines if all less-preferred stored SID elements 64 in the roaming list 60 have been scanned for acquisition at step 428. As shown in step 428, if the logic circuitry 30 determines that n has not reached N such that additional less-preferred stored SID elements 64 are available in the roaming list 60 and have not been scanned, then the current value n corresponding to the current less-preferred stored SID element 64 is incremented at step 434 and the process continues to step 416 for scanning of each less-preferred stored SID element 64 before the next less-preferred stored SID element 64 is scanned.

Returning to step 426, if acquisition is possible on the $n^{th}$ current less-preferred stored SID element, then the logic circuitry 30 tests to see if all more-preferred SID acquisition scan sequences have been performed at step 436. As shown in step 436, if all more-preferred SID acquisition sequences have been performed, such as the second and final more-preferred SID sequence, then logic circuitry 30 camps on the current less-preferred communication SID element at step 438 for service and continues at step 428. According to one alternative embodiment, before continuing processing at step 428, logic circuitry 30 may wait for the system timer to expire before repeating the acquisition scan sequence. If, however, the logic circuitry 30 determines that not all more-preferred SID acquisition sequences have been completed, then the logic circuitry 30 stores the nth less preferred SID element 64 previously found and processing continues at step 428 to determine if all less-preferred stored SID elements 64 have been scanned. If all less-preferred stored SID elements 64 have been scanned as shown in step 428 by comparing the current less-preferred stored SID element n with the maximum number of less-preferred stored SID elements N in roaming list 60, then the processing continues at step 430.

As shown in step 430, if the logic circuitry 30 has not performed the maximum number of scans, S, then the scan counter "scan" is incremented at step 432 and processing continues at step 414. The logic circuitry 30 will scan each more-preferred stored SID element 62 and each less-preferred stored SID element 64 according to the next scan sequence. If the logic circuitry 30 has performed the maximum number of scans S, then the logic circuitry 30 has scanned each more-preferred stored SID element 62 and each less-preferred stored SID element 64 in the roaming list 60 according to the programmed number of more-preferred SID sequences and processing continues at decision step 440.

As shown at step 440, the logic circuitry 30 determines if an nth less-preferred stored SID element 64 was previously found at step 437 by for example, determining if nth less-preferred stored SID element 64 was previously stored. If the nth less-preferred stored SID element 64 was previously found, then the logic circuitry 30 camps on the nth less-preferred stored SID element 64 at step 438. If the logic circuitry 30 has not been able to acquire service on the nth less-preferred stored SID element 64, or the at least one more-preferred stored SID element 62 even after execution of all of the programmed more-preferred SID sequences, the logic circuitry 30 may repeat the scan sequence at step 412. Accordingly, the logic circuitry 30 gives priority to acquisition attempts for each more-preferred stored SID element 62, as previously described, in order to increase the chances of reacquiring service for the wireless device 10 with the more-preferred stored SID element 62, such as the home system.

According to one embodiment, the logic circuitry 30 may wait a certain amount of time in order to reattempt acquisition for the at least one more-preferred SID element 62. For example, if the wireless device 10 enters into a coverage hole or an interference region and coverage resumes, then the logic circuitry 30 may wait a predefined amount of time and attempt to reacquire the at least one of the more-preferred stored SID element 62. Accordingly, logic circuitry 30 waits for a system timer to expire in order to continue processing at step 412. Since no SID elements were acquired during "S" scans (i.e., the previous entire first, second and so forth number of more-preferred SID sequences), the wireless device 10 waits for a system timer that may be programmed for a predetermined amount of time such as two seconds, four seconds, ten seconds, thirty seconds, two minutes, ten minutes, one hour, or any suitable amount of time to reattempt acquisition. Once the system timer expires, then the logic circuitry 30 sets the scan count "scan" to zero at step 412 and proceeds beginning with the first more-preferred SID acquisition sequence 62 at step 414 as previously described. Alternatively, logic circuitry 30 sets "scan" equal to one or any suitable number in order to repeat a second acquisition scan sequences, such as for example, the second more-preferred SID acquisition sequence 82.

According to one embodiment, the at least one more-preferred stored SID element 62 in the roaming list 60 includes a first more-preferred stored SID element and a second more-preferred SID element. According to this example, the logic circuitry 30 attempts acquisition according to the second more more-preferred SID acquisition sequence 82 such that the logic circuitry 30 sequentially attempts acquisition of the first more-preferred stored SID element, the second more-preferred stored SID element and then the logic circuitry 30 makes a single acquisition attempt to acquire each one less-preferred stored SID element. As an example of the second more-preferred SID sequence according to this embodiment, if the roaming list 60 includes one more-preferred stored SID element 62 equal to one (i.e., SID=1), and a less-preferred stored SID element 64 equal to two (i.e., SID=2) and another less-preferred stored SID element equal to three (i.e., SID=3), then the second more-preferred SID acquisition sequence would be 1-2-1-3 if none of the less-preferred stored SID elements 64 were previously acquired. If, however, the roaming list 60 included a first more-preferred stored SID element 62 equal to one (i.e., SID=1), a second more-preferred stored SID element equal to two (i.e., SID=2), and the less-preferred stored SID element equals three (i.e., SID=3), then the second more-preferred SID acquisition sequence would be 1-2-3 etc if none of the less-preferred stored SID elements 64 were previously acquired.

Since the logic circuitry 30 alternately and repeatedly scans each one of the more-preferred stored SID elements 62 in a sequence, a frequency of scanning the at least one more-preferred stored SID element 62 is greater than a frequency of scanning each of the at least one less-preferred stored SID elements 64. Returning to the above example, where the plurality of SID elements include a first more-preferred stored SID element 62 and two less-preferred stored SID elements 64, the second more-preferred SID acquisition sequence 82 will repeat the more-preferred stored SID element 62 on every alternate scan (1-2-1-3, 1-2-1-3) if none of the less-preferred stored SID elements 64 were previously acquired. As a result, although the more-preferred stored SID element 62 is only one of three SID elements in the roaming list 60, the logic circuitry 30 scans the more-preferred stored SID element 62 more frequently than each less-preferred stored SID element 64. Further, as the number of SID elements in the roaming list 60 increases, then the frequency of scanning the at least one more-preferred stored SID element 62 is relatively greater than the frequency of scanning the at least one less-preferred stored SID element 64. For example, if the roaming list 60 includes one more-preferred stored SID element 62 (i.e., SID=1) and five less-preferred stored SID elements 64 (i.e., SIDs=2, 3, 4, 5), then the second more-preferred SID acquisition sequence 82 would be 1-2, 1-3, 1-4, 1-5 if none of the less-preferred stored SID elements 64 were previously acquired. Although the more-preferred stored SID element 62 is one of six SID elements in the roaming list 60, the more-preferred stored SID element 62 receives half of all SID element acquisition attempts, and therefore the frequency of scanning the more-preferred stored SID element 62 is greater than the frequency of scanning any individual less-preferred stored SID element 64.

Figure 6:
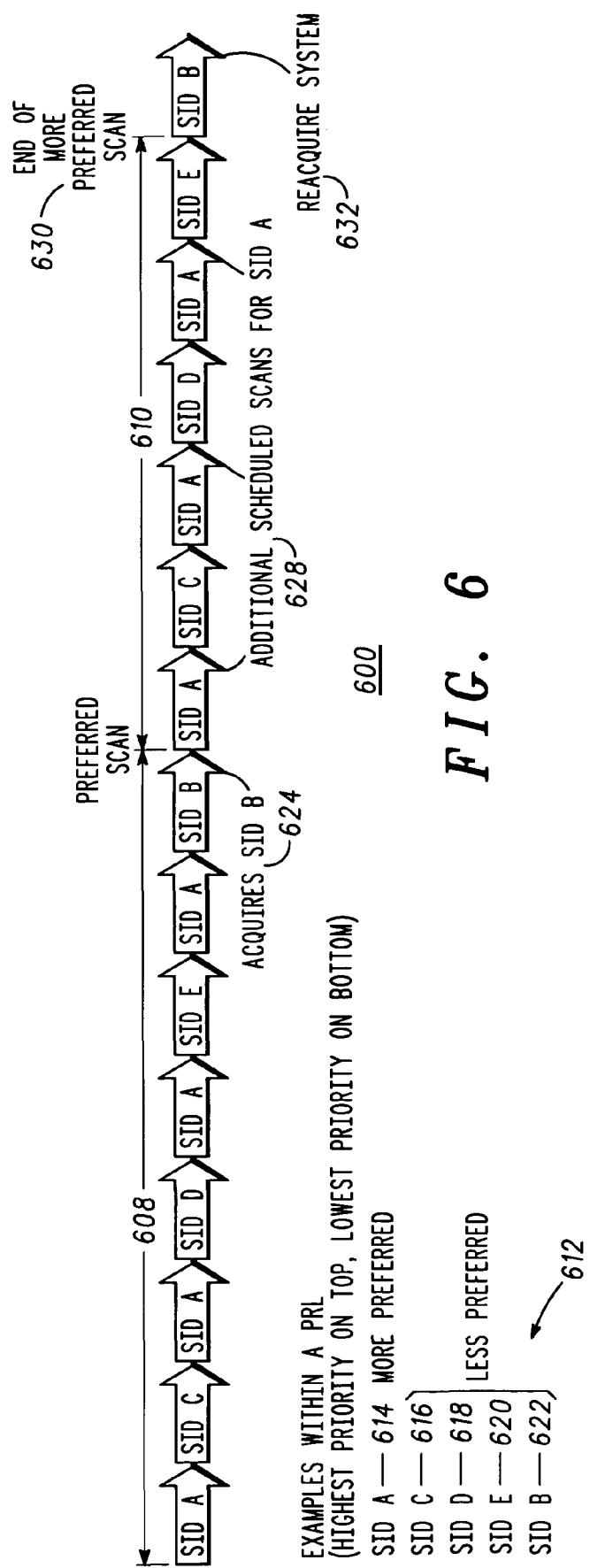
FIG. 6 is a diagram illustrating one example of an acquisition scan sequence according to one embodiment of the invention.

FIG. 6 is a diagram illustrating an example of an acquisition scan sequence 600 according to one embodiment of the invention. The acquisition scan sequence according to one embodiment of the invention 602 includes a first more-preferred SID acquisition sequence 608 and a second more-preferred SID acquisition sequence 610. According to this example, the roaming list 612 includes a more-preferred stored SID element 614 (i.e., SID=A), a less-preferred stored SID element 616 (i.e., SID=C), a less-preferred stored SID element 618 (i.e., SID=D), a less-preferred stored SID element 620 (i.e., SID=E), and a less-preferred stored SID element 622 (i.e., SID=B). In other words, the roaming list 612 includes the one more-preferred stored SID element 614 (i.e., SID=A) and four less-preferred stored SID elements 616, 618, 620, 622 (i.e., SIDs=C, D, E, and B). According to this example, the logic circuitry 30 only acquires SID=B 624.

As previously described, a conventional acquisition scan sequence includes a first conventional SID acquisition sequence and a second conventional SID acquisition sequence. The first conventional SID acquisition sequence may be for example, A-C, A-D, A-E, A-B where logic circuitry 30 only acquires SID=B 622 in this example. Since the logic circuitry 30 did not acquire the more-preferred stored SID element, SID=A 614, logic circuitry performs the second conventional SID acquisition sequence 604. The second conventional SID acquisition sequence would be A-C-D-E as is known in the art. Since SID=B 622 was previously acquired during the first conventional SID acquisition sequence, logic circuitry 30 does not attempt to reacquire SID=B 622. According to this example, since a higher priority SID was not acquired above SID=B 622, logic circuitry 30 camps on SID=B 622. SID=A 614 received equal preference during the second conventional SID acquisition sequence with the less preferred SID elements and as a result, received only one fourth of the four scan attempts.

The first more-preferred SID acquisition sequence 608 is A-C, A-D, A-E, A-B. Since the logic circuitry 30 did not acquire the more-preferred stored SID element SID=A 614, logic circuitry 30 performs the second more-preferred SID acquisition sequence 610. According to this embodiment, the first more-preferred SID acquisition sequence 608 is the same as the first conventional SID acquisition sequence. The second more-preferred SID acquisition sequence 610 is A-C, A-D, A-E and includes additional scheduled scans for SID A 628. Since SID=B 622 was previously acquired 624 during the first more-preferred SID acquisition sequence 608, logic circuitry 30 does not attempt to reacquire SID=B 622 during the second more-preferred SID acquisition sequence 610. According to this example, since a higher priority SID was not acquired by the end of the more preferred scan 630, logic circuitry 30 reacquires SID=B 622, 632. Although the more-preferred stored SID element SID=A 614 is one of five SID elements in the roaming list 612, the more-preferred stored SID element SID=A 614 receives half of all six SID element acquisition attempts, and therefore the frequency of scanning the more-preferred stored SID element, SID=A 614, is greater than the frequency of scanning any individual less-preferred stored SID elements 616, 618, 620, and 622. For example, if wireless device 10 emerges from a coverage hole or interference region during the second, or third scan of the first more-preferred SID acquisition sequence 608, then the logic circuit 30 will acquire the more-preferred stored SID element, SID=A 614. By contrast, the logic circuit 30 performing the second conventional SID acquisition sequence would not acquire the more-preferred stored SID element, SID=A 614 in this example.

According to one embodiment, each of the SID elements in the roaming list 60 is associated with a plurality of prioritized groups of communication systems. Each prioritized group of communication systems is associated with a priority. For example, the prioritized groups of communication systems may be represented as geographic regions that include SID elements within that geographic region. If multiple geographic regions cover the same geographic region or overlap a geographic region, then each geographic region may be assigned a priority. As a result, a frequency of scanning each SID element in the roaming list 60 may be proportional to the priority of the prioritized group associated with the communication system. Accordingly, SID elements in a geographic region that have a higher priority than SID elements in another geographic region will have a greater frequency of scanning. For example, each geographic region may further be associated with a type of modulation scheme such as wideband CDMA (WCDMA) and GSM.

Among other advantages, the present invention improves the acquisition of and search for at least one more-preferred stored SID element 62 stored in the roaming list 60. As previously stated, conventional scanning sequences in roaming algorithms would scan for the home system only once within the second more-preferred SID sequence. Since the second more-preferred SID acquisition sequence in the present invention scans more often for the more-preferred system than in conventional roaming algorithms the probability of acquiring at least one more-preferred stored SID element 62 increases. The logic circuitry 30 continues scanning for the more-preferred (i.e., home) system even after the logic circuitry 30 determines that acquisition on the more-preferred system is unavailable and acquires service from a less-preferred system. By extending the search for the more-preferred system after a less-preferred system is acquired, the window of opportunity to find the more-preferred system will be increased thus increasing the likelihood that the wireless device will acquire the more-preferred system. Additionally, extending the total time that the logic circuitry 30 attempts to acquire the more-preferred system, as well as increasing the number of acquisition attempts, further increases the probability that a wireless device 10 will acquire at least one more-preferred stored SID element 62 especially in the situations where the wireless device 10 passes through a coverage hole or interference region.

Further, as the performance of receiver circuits improves generally, such as the ability of the receiver circuit to scan and acquire an SID element more quickly, the scanning receiver spends a proportionately shorter amount of time scanning and acquiring SID information. As the scan time decreases, the scan time for acquiring the most-preferred system decreases, and therefore the chance of finding the most-preferred system decreases. Consequently, as the scan time decreases, increasing the total time, and the number of attempts to acquire the more-preferred stored SID 62 can significantly increase the likelihood of acquiring the more-preferred system.

It should be understood that the implementation of other variations and modifications of this invention in its various aspects will be apparent to those of ordinary skill in the art and that the invention is not limited by specific embodiments described. It is therefore contemplated to cover by the present invention, any and all modifications, variations or equivalents that fall within the spirit and scope of the basic underlying principles disclosed and claim herein.

What is claimed is:

1. A circuit operative to acquire a more-preferred stored system identification (SID) element comprising:
   memory containing a roaming list that includes a plurality of stored SID elements ranked according to an order of preference including at least one more-preferred stored SID element and at least one less-preferred stored SID element; and
   logic circuitry, operatively coupled to the memory, and operative to perform a first more-preferred SID acquisition sequence and then a second more-preferred SID acquisition sequence that includes repeatedly attempting acquisition of the at least one more-preferred stored SID element using a same frequency during the second more-preferred SID acquisition sequence.

2. The circuit of claim 1 wherein the logic circuitry is operative to attempt acquisition of the at least one less-preferred stored SID element as part of performing the second more-preferred SID acquisition sequence.

3. The circuit of claim 1 wherein the logic circuitry is operative to perform the second more-preferred SID acquisition sequence if the more-preferred stored SID element is not acquired during the first more-preferred SID acquisition sequence.

4. The circuit of claim 1 wherein the logic circuitry is operative to attempt acquisition by comparing received broadcast SID information with one of the plurality of stored SID elements ranked according to an order of preference including at least one more-preferred stored SID element and at least one less-preferred stored SID element.

5. The circuit of claim 1 wherein the roaming list includes a first more-preferred stored SID element, a second more-preferred stored SID element, and a plurality of less preferred SID elements wherein the logic circuitry is operative to perform the second more-preferred SID acquisition sequence that includes repeatedly attempting acquisition of the first more-preferred stored SID element, and repeatedly attempting acquisition of the second more-preferred stored SID element using the same frequency and a single acquisition attempt of each of the at least one less-preferred stored SID element as part of the second more preferred SID acquisition sequence.

6. A wireless device comprising:
   memory containing a roaming list that includes a plurality of stored system identification (SID) elements ranked according to an order of preference including at least one more-preferred stored SID element and at least one less-preferred stored SID element;
   a wireless receiver operative to receive transmitted SID information; and
   logic circuitry, operatively coupled to the memory, and operative to perform a first more-preferred SID acquisition sequence and then a second more-preferred SID acquisition sequence that includes repeatedly attempting acquisition of the at least one more-preferred stored SID element using a same frequency during the second more-preferred SID acquisition sequence.

7. The wireless device of claim 6 wherein the logic circuitry is operative to attempt acquisition of the at least one less-preferred stored SID element as part of performing the second more-preferred SID acquisition sequence.

8. A wireless device comprising:
   memory containing a roaming list that includes a plurality of stored system identification (SID) elements ranked according to an order of preference including at least one more-preferred stored SID element and a plurality of less-preferred stored SID elements;
   a wireless receiver operative to receive broadcast SID information; and
   logic circuitry, operatively coupled to the memory, and operative to perform a first more-preferred SID acquisition sequence and then a second more-preferred SID acquisition sequence that includes, during the second more-preferred SID acquisition sequence, repeatedly attempting acquisition of the at least one more-preferred stored SID element at a same frequency and a single acquisition attempt of each of the plurality of less-preferred stored SID elements not acquired during the first more-preferred SID acquisition sequence as part of the second more preferred SID acquisition,
   wherein attempting acquisition is based on a comparison of the received broadcast SID information with one of the plurality of stored SID elements, and
   wherein the second more-preferred SID acquisition sequence is again performed if acquisition of the plurality of stored SID elements in the roaming list is unavailable.

9. The wireless device of claim 8 wherein the logic circuitry camps on at least one less-preferred stored SID element if acquisition on the at least one less-preferred stored SID element is available and if acquisition on the at least one more-preferred stored SID element is unavailable, and wherein the logic circuitry camps on the at least one more-preferred SID stored element if the at least one more-preferred stored SID element is acquired at any time.

10. A memory containing computer readable instructions executable by one or more processing devices that causes the one or more processing devices to:
   store a roaming list that includes a plurality of stored system identification (SID) elements ranked according to an order of preference including at least one more-preferred stored SID element and at least one less-preferred stored SID element; and
   perform a first more-preferred SID acquisition sequence and then a second more-preferred SID acquisition sequence that includes repeatedly attempting acquisition of the at least one more-preferred stored SID element during the second more-preferred SID acquisition sequence using a same frequency.

11. The memory of claim 10 containing executable instructions that cause the one or more processing devices to attempt acquisition of the at least one less-preferred stored SID element while performing the second more-preferred SID acquisition sequence.

12. The memory of claim 10 containing executable instructions that cause the one or more processing devices to perform the second more-preferred SID acquisition sequence if the more-preferred stored SID element is not acquired during the first more-preferred SID acquisition sequence.

13. The memory of claim 10 containing executable instructions that cause the one or more processing devices to:
   store a first more-preferred stored SID element, a second more-preferred stored SID element, and a plurality of less preferred SID elements in the roaming list; and
   repeatedly attempt acquisition of the first more-preferred stored SID element, repeatedly attempt acquisition of the second more-preferred stored SID element and perform a single acquisition attempt of each of the at least one less-preferred stored SID element as part of performing the second more-preferred SID acquisition sequence.

14. A method for acquiring a more-preferred stored system identification (SID) element in a wireless device, the method comprising:
   storing a roaming list that includes a plurality of stored SID elements ranked according to an order of preference including at least one more-preferred stored SID element and at least one less-preferred stored SID element; and
   performing a first more-preferred SID acquisition sequence and then a second more-preferred SID acquisition sequence that includes repeatedly attempting acquisition of the at least one more-preferred stored SID element using a same frequency during the second more-preferred SID acquisition sequence.

15. The method of claim 14 including receiving broadcast SID information, wherein attempting acquisition is based on comparing the received broadcast SID information with one of the plurality of stored SID elements.

16. The method of claim 14 further including:
   camping on the at least one more-preferred stored SID element if acquisition of the at least one more-preferred stored SID element is available; and
   camping on the at least one less-preferred stored SID element if acquisition of the at least one less-preferred stored SID element is available and if acquisition of the at least one more-preferred stored SID element is unavailable.

17. The method of claim 15 further including performing the second more-preferred SID acquisition sequence if the more-preferred stored SID element is not acquired during the first more-preferred SID acquisition sequence.

18. The method of claim 15 further including attempting acquisition of the at least one less-preferred stored SID element as part of performing the second more-preferred SID acquisition sequence.

19. A method for acquiring a more-preferred stored system identification (SID) element in a wireless device, the method comprising:
   storing a roaming list that includes a plurality of stored SID elements ranked according to an order of preference including at least one more-preferred stored SID element and a plurality of less-preferred stored SID elements;
   performing a first more-preferred SID acquisition sequence and then a second more-preferred SID acquisition sequence that includes, during the second more-preferred SID acquisition sequence, repeatedly attempting acquisition of the at least one more-preferred stored SID element at a same frequency and a single acquisition attempt of each of the plurality of less-preferred stored SID elements not acquired during the first more-preferred SID acquisition sequence;
   receiving broadcast SID information wherein attempting acquisition is performed by comparing the received broadcast SID information with one of the plurality of stored SID elements; and repeatedly performing the second more-preferred SID acquisition sequence if acquisition of the plurality of stored SID elements in the roaming list is unavailable.

20. The method of claim 19 further including:

camping on the at least one more-preferred stored SID element if acquisition of the at least one more-preferred stored SID element is available; and camping on the at least one less-preferred stored SID element if acquisition of the at least one less-preferred stored SID element is available and if acquisition of the at least one more-preferred stored SID element is unavailable.

21. The circuit of claim 1 wherein the more-preferred stored SID element defines the home system.

* * * * *